(12) United States Patent
Cho et al.

(10) Patent No.: US 11,755,404 B2
(45) Date of Patent: Sep. 12, 2023

(54) CUSTOM BASEBOARD MANAGEMENT CONTROLLER (BMC) FIRMWARE STACK MONITORING SYSTEM AND METHOD

(71) Applicant: Dell Products, L.P., Round Rock, TX (US)

(72) Inventors: Eugene David Cho, Austin, TX (US); Prashanth Giri, Round Rock, TX (US); Timothy M. Lambert, Austin, TX (US); Akkiah Choudary Maddukuri, Austin, TX (US); Chandrasekhar Mugunda, Austin, TX (US); Arun Muthaiyan, Round Rock, TX (US); Sreeram Veluthakkal, Pflugerville, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 17/346,802

(22) Filed: Jun. 14, 2021

(65) Prior Publication Data

US 2022/0398152 A1    Dec. 15, 2022

(51) Int. Cl.

| G06F 11/00 | (2006.01) |
|---|---|
| G06F 11/07 | (2006.01) |
| G06F 21/62 | (2013.01) |
| G06F 11/14 | (2006.01) |
| G06F 21/60 | (2013.01) |

(52) U.S. Cl.
CPC ...... *G06F 11/0793* (2013.01); *G06F 11/0706* (2013.01); *G06F 11/076* (2013.01); *G06F 11/0787* (2013.01); *G06F 11/1417* (2013.01); *G06F 21/602* (2013.01); *G06F 21/6209* (2013.01); *G06F 2201/81* (2013.01)

(58) Field of Classification Search
CPC ............ G06F 11/0751; G06F 11/0754; G06F 11/076; G06F 11/0766; G06F 11/0787; G06F 11/0793; G06F 11/1417; G06F 21/50; G06F 21/51; G06F 21/52; G06F 21/572; G06F 21/575; G06F 21/602; G06F 21/6209; G06F 2221/2107; G06F 2221/2147; G06F 11/3003; G06F 11/3013; G06F 11/3024; G06F 11/3058; G06F 11/32; G06F 11/324; G06F 11/327; G06F 11/328; G06F 11/3055
See application file for complete search history.

(56) References Cited

U.S. PATENT DOCUMENTS

| 9,930,051 B1* | 3/2018 | Potlapally | H04L 63/126 |
| 9,935,945 B2* | 4/2018 | Li | H04L 63/123 |
| 10,346,187 B1* | 7/2019 | Trier | G06F 9/455 |

(Continued)

*Primary Examiner* — Anthony J Amoroso
(74) *Attorney, Agent, or Firm* — Fogarty LLP (57) ABSTRACT

An Information Handling System (IHS) includes multiple hardware devices, and a baseboard Management Controller (BMC) in communication with multiple hardware devices of the IHS. The BMC includes executable instructions for monitoring a parameter of one or more of the hardware devices when a custom BMC firmware stack is executed on the BMC. The instructions that monitor the parameter are separate and distinct from the instructions of the custom BMC firmware stack. The instructions also control the BMC to perform one or more operations to remediate an excessive parameter when the parameter exceeds a specified threshold.

19 Claims, 4 Drawing Sheets

(56) References Cited

U.S. PATENT DOCUMENTS

| | | | |
|---|---|---|---|
| 2011/0090087 A1* | 4/2011 | Berke | G06F 1/206 |
| | | | 340/584 |
| 2011/0258410 A1* | 10/2011 | Lambert | G06F 21/78 |
| | | | 713/170 |
| 2015/0052596 A1* | 2/2015 | Ayanam | H04W 4/38 |
| | | | 726/8 |
| 2016/0063255 A1* | 3/2016 | Jeansonne | G06F 21/575 |
| | | | 713/2 |
| 2021/0333850 A1* | 10/2021 | Chang | G06F 1/206 |

\* cited by examiner

CUSTOM BASEBOARD MANAGEMENT CONTROLLER (BMC) FIRMWARE STACK MONITORING SYSTEM AND METHOD

FIELD

The present disclosure generally relates to electronics, and, more particularly, to a custom baseboard management controller (BMC) firmware stack monitoring system and method.

BACKGROUND

An Information Handling System (IHS) generally refers to any computing system that processes, compiles, stores, and/or communicates information or data for business, personal, or other purposes. Modern day IHS administrative management is often provided via baseboard management controllers (BMCs). The baseboard management controller (BMC) generally includes a specialized microcontroller embedded in the IHS, and may provide an interface between system-management software and platform hardware. Different types of sensors built into the IHS report to the BMC on parameters such as temperature, cooling fan speeds, power status, operating system (O/S) status, and the like. The BMC monitors the sensors and can send alerts to a system administrator via the network if any of the parameters do not stay within pre-set limits, indicating a potential failure of the system. The administrator can also remotely communicate with the BMC to take certain corrective actions, such as resetting or power cycling the system to get a hung O/S running again. These abilities can often save on the total cost of ownership of an IHS, particularly when implemented in large clusters, such as server farms.

SUMMARY

According to one embodiment, an Information Handling System (IHS) includes multiple hardware devices, and a baseboard Management Controller (BMC) in communication with the plurality of hardware devices. The BMC includes executable instructions for monitoring a parameter of one or more of the hardware devices when a custom BMC firmware stack is executed on the BMC. The instructions that monitor the parameter are separate and distinct from the instructions of the custom BMC firmware stack. The instructions also control the BMC to perform one or more operations to remediate an excessive parameter when the parameter exceeds a specified threshold.

According to another embodiment, a method includes the steps of monitoring a parameter of one or more of the hardware devices of the IHS when a custom BMC firmware stack is executed on the BMC. The instructions that monitor the parameter are separate and distinct from the instructions of the custom BMC firmware stack. The method also includes the steps of controlling the BMC to perform one or more operations to remediate an excessive parameter when the parameter exceeds a specified threshold.

According to yet another embodiment, a BMC includes computer-readable instructions for when a custom BMC firmware stack is executed on the BMC, monitoring a parameter of one or more of the hardware devices of the IHS. The instructions that monitor the parameter are separate and distinct from the instructions of the custom BMC firmware stack. The instructions also control the BMC to perform one or more operations to remediate an excessive parameter when the parameter exceeds a specified threshold.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Embodiments described herein comprise systems and methods for monitoring baseboard management controllers (BMCs) that are installed with custom BMC firmware stacks. Whereas custom BMC firmware stacks may be created and implemented with little or no control over how the BMC hardware or its associated IHS is configured, they may exhibit certain problems that, if not resolved, can inflict damage to the IHS or even the BMC hardware itself. Embodiments of the present disclosure provide a solution to this problem, among others, using a system and method that monitors certain parameters of the IHS to determine if certain protection thresholds have been crossed due to use of the custom BMC firmware stack, and if so, perform one or more operations to remediate the exceeded protection thresholds.

Certain IHSs may be configured with BMCs that are used to monitor, and in some cases manage computer hardware components of their respective IHSs. A BMC is normally programmed using a firmware stack that configures the BMC for performing out-of-band (e.g., external to a computer's operating system or BIOS) hardware management tasks. The BMC firmware can support industry-standard specifications, such as the Intelligent Platform Management Interface (IPMI) and Systems Management Architecture of Server Hardware (SMASH) for computer system administration.

The BMC firmware is normally proprietary and is often developed by the vendor and shipped along with the BMC to the end user. Nevertheless, industry trends have migrated toward custom BMC firmware stacks (e.g., operating systems) that allow the end user greater control over how the BMC operates. OpenBMC is one example standard under which custom BMC firmware stacks may be generated. In general, openBMC is a collaborative open-source Linux distribution for BMCs meant to work across heterogeneous systems that include enterprise, high-performance computing (HPC), telecommunications, and cloud-scale data centers.

While custom BMC firmware stacks, such as those implemented according to openBMC standards, may provide enhanced manageability, transparency, and customization, its implementation has not been without drawbacks. For example, standard BMC firmware stacks are often implemented by the vendor of the IHS in which the BMC is deployed and therefore, the quality and reliability of the BMC's functionality can be controlled to a relatively good degree. One example of such a standard BMC firmware stack is the iDRAC firmware stack provided by the DELL CORPORATION. On the other hand, custom BMC firmware stacks, which are typically developed in uncontrolled environments, often possess relatively higher levels of software faults (e.g., bugs).

This drawback can be particularly problematic when certain control functions allocated to the BMCs can ruin or damage their respective IHSs if not properly managed. For example, whereas BMCs may be configured to control the fan speed of any of a number of fans configured in the IHS, either inadvertent or malicious algorithms within the custom BMC firmware stack can cause the fans to turn too slowly, thus yielding an overheating condition which in turn may cause physical damage. As another example, modern day BMCs are often configured with small memory components (e.g., an electronic multimedia card (eMMC)) due to their relatively low cost and small size; nevertheless, excessive read/write cycle rates caused by custom BMC firmware stack algorithms can cause damage to these memory components. Embodiments of the present disclosure provide a custom BMC firmware stack monitoring system and method that monitors the activities of the IHS as well as a BMC deployed with a custom BMC firmware stack, and provides certain remediation operations should certain protection parameters of the IHS become excessive due to use of the custom BMC firmware stack.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, science, control, or other purposes. For example, an IHS may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price.

The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, touchscreen and/or a video display. The IHS may also include one or more buses operable to transmit communications between the various hardware components.

Figure 1:
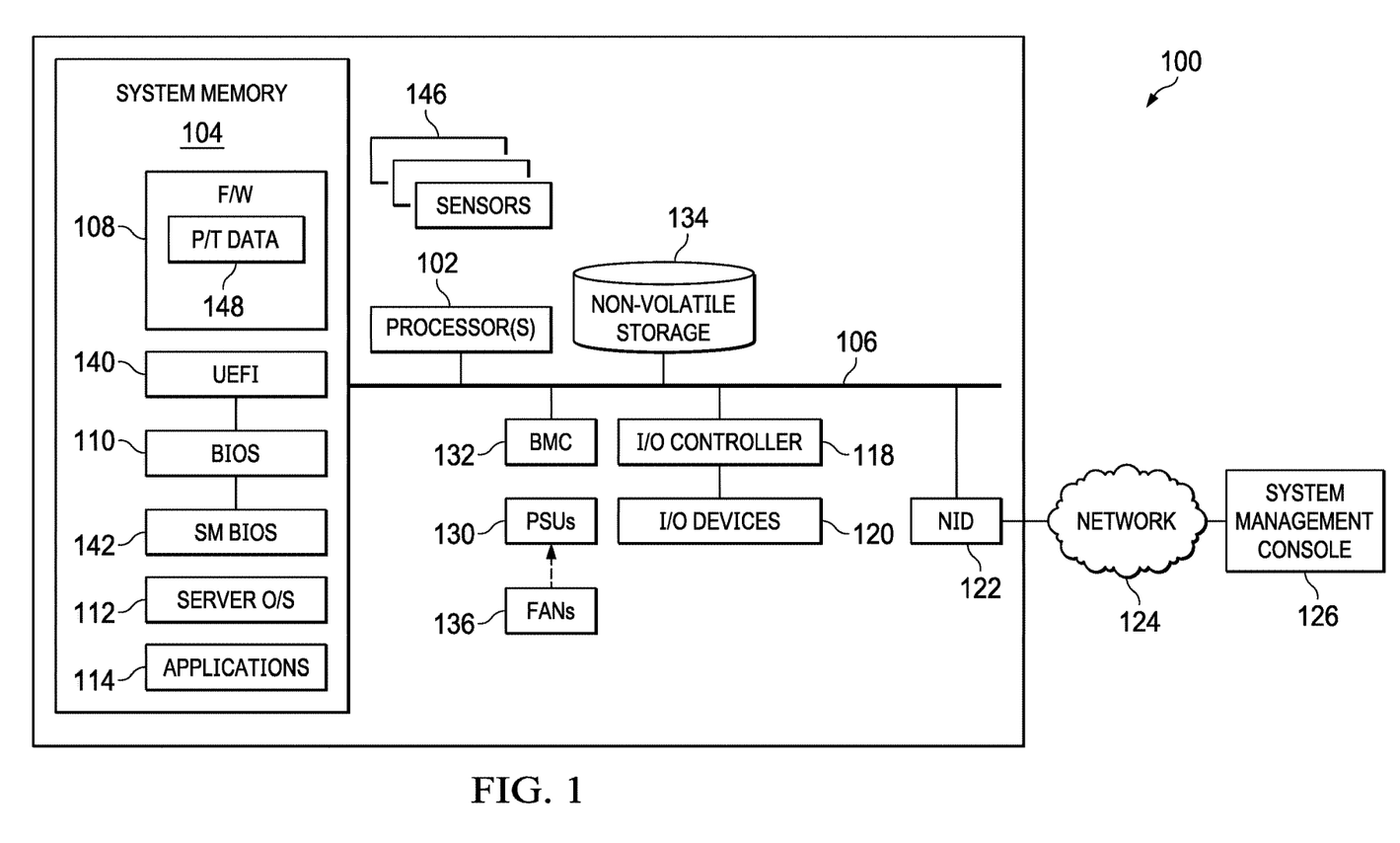
FIG. 1 is a block diagram of examples of components of an Information Handling System (IHS), according to some embodiments.

FIG. 1 is a block diagram of examples of components of an Information Handling System (IHS), according to some embodiments. Particularly, IHS 100 includes one or more processor(s) 102 coupled to system memory 104 via system interconnect 106. System interconnect 106 may include any suitable system bus. System memory 104 may include a plurality of software and/or firmware modules including firmware (F/W) 108, basic input/output system (BIOS) 110, operating system (O/S) 112, and/or application(s) 114. Software and/or firmware module(s) stored within system memory 104 may be loaded into processor(s) 102 and executed during operation of IHS 100.

F/W 108 may include a power/thermal profile data table 148 that is used to store power profile data and thermal profile data for certain hardware devices (e.g., processor(s) 102, system memory 104, non-volatile storage 134, NID 122, I/O controllers 118, etc.). System memory 104 may include a UEFI interface 140 and/or a SMBIOS interface 142 for accessing the BIOS as well as updating BIOS 110. In general, UEFI interface 140 provides a software interface between an operating system and BIOS 110. In many cases, UEFI interface 140 can support remote diagnostics and repair of computers, even with no operating system installed. SMBIOS interface 142 can be used to read management information produced by BIOS 110 of an IHS 100. This feature can eliminate the need for the operating system to probe hardware directly to discover what devices are present in the computer.

IHS 100 includes one or more input/output (I/O) controllers 118 which manages the operation of one or more connected input/output (I/O) device(s) 120, such as a keyboard, mouse, touch screen, microphone, a monitor or display device, a camera, a microphone, audio speaker(s) (not shown), an optical reader, a universal serial bus (USB), a card reader, Personal Computer Memory Card International Association (PCMCIA) slot, and/or a high-definition multimedia interface (HDMI), which may be included or coupled to IHS 100.

IHS 100 includes Network Interface Device (NID) 122. NID 122 enables IHS 100 to communicate and/or interface with other devices, services, and components that are located externally to IHS 100. These devices, services, and components, such as a system management console 126, can interface with IHS 100 via an external network, such as network 124, which may include a local area network, wide area network, personal area network, the Internet, etc.

IHS 100 further includes one or more power supply units (PSUs) 130. PSUs 130 are coupled to a BMC 132 via an I$^2$C bus. BMC 132 enables remote operation control of PSUs 130 and other components within IHS 100. PSUs 130 power the hardware devices of IHS 100 (e.g., processor(s) 102, system memory 104, non-volatile storage 134, NID 122, I/O controllers 118, PSUs 130, etc.). To assist with maintaining temperatures within specifications, an active cooling system, such as one or more fans 136 may be utilized.

IHS 100 further includes one or more sensors 146. Sensors 146 may, for instance, include a thermal sensor that is in thermal communication with certain hardware devices that generate relatively large amounts of heat, such as processors 102 or PSUs 130. Sensors 146 may also include voltage sensors that communicate signals to BMC 132 associated with, for example, an electrical voltage or current at an input line of PSU 130, and/or an electrical voltage or current at an output line of PSU 130.

BMC 132 may be configured to provide out-of-band management facilities for IHS 100. Management operations may be performed by BMC 132 even if IHS 100 is powered off, or powered down to a standby state. BMC 132 may include a processor, memory, and an out-of-band network interface separate from and physically isolated from an in-band network interface of IHS 100, and/or other embedded resources.

In certain embodiments, BMC 132 may include or may be part of a Remote Access Controller (e.g., a DELL Remote Access Controller (DRAC) or an Integrated DRAC (iDRAC)). In other embodiments, BMC 132 may include or may be an integral part of a Chassis Management Controller (CMC).

Figure 2:
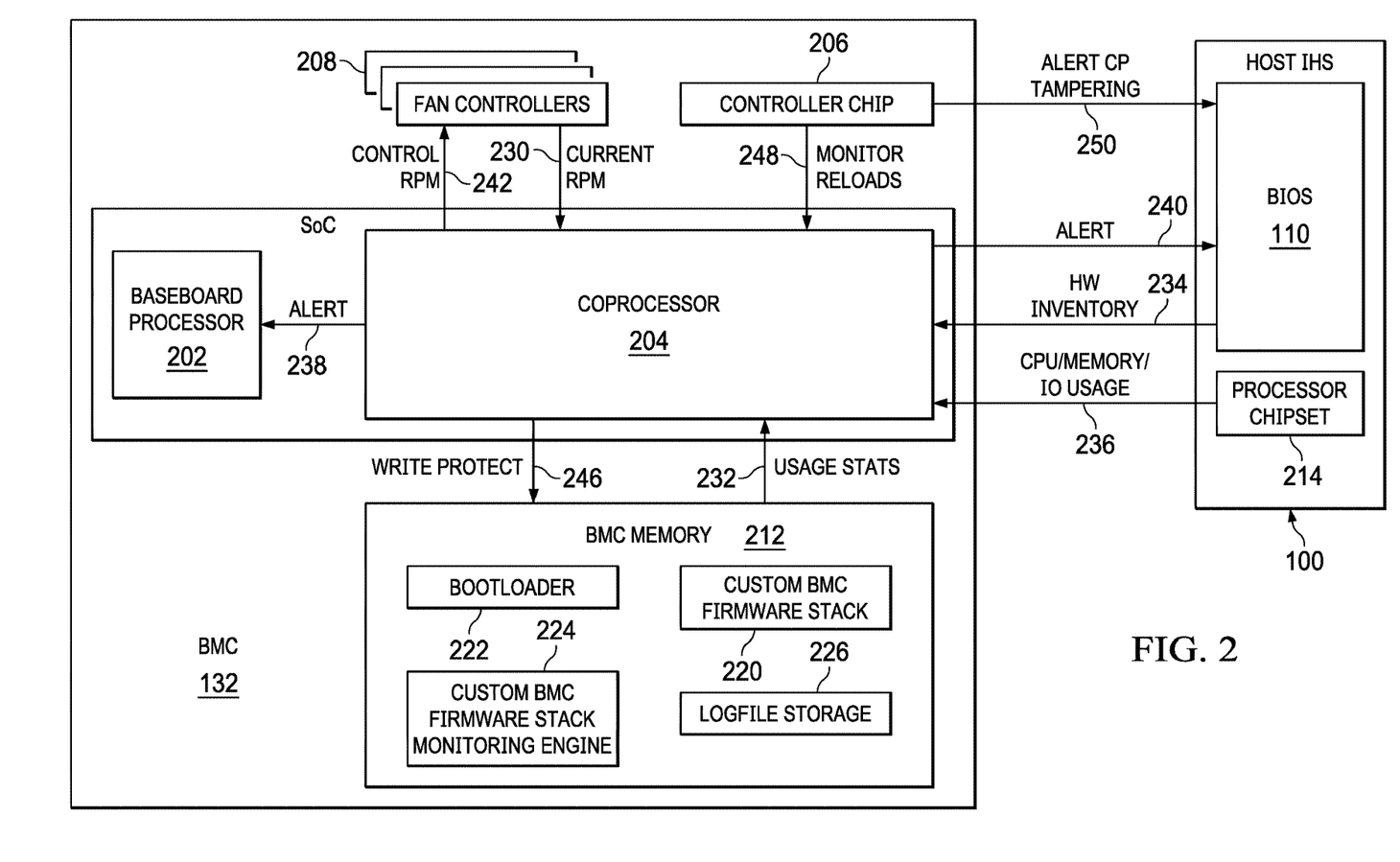
FIG. 2 illustrates several components of an example BMC along with those of an associated IHS showing how those components may signal one another for implementing the custom BMC firmware stack monitoring system according to one embodiment of the present disclosure.

FIG. 2 is a diagram 200 illustrating several components of an example BMC 132 along with those of an associated IHS 100 showing how those components may signal one another for implementing the custom BMC firmware stack monitoring system according to one embodiment of the present disclosure. BMC 132 generally includes a baseboard processor 202, a coprocessor 204, a controller chip 206, one or more fan controllers 208, and a BMC memory 212. The IHS 100 on the other hand, is shown including a BIOS 110, and a processor chipset 214. As shown, the baseboard processor 202 and coprocessor 204 may be provided together in a system on chip device 216. In other embodiments, the baseboard processor 202 and coprocessor 204 may be provided as discreet entities. The BMC 132 and IHS 100 are shown with those components described above for purposes of brevity and clarity of discussion, it should be appreciated that either of the BMC 132 and/or IHS 100 may be configured with additional, fewer, or different components without departing from the spirit and scope of the present disclosure.

The BMC memory 212 may integrally formed with the baseboard processor 202, coprocessor 204, and/or controller chip 206, or it may be discreetly separate therefrom. In one embodiment, the BMC memory 212 may be implemented on a memory device (e.g., an electronic multimedia card (eMMC), an electronic universal flash storage (eUFS), or a low-power double data rate (LPDDR) memory device, etc.). The BMC memory 212 is configured to store a bootloader 222, a custom BMC firmware stack monitoring engine 224, a custom BMC firmware stack 220, and logfile storage 226. The bootloader 222 may include any type of executable code for launching or booting the custom BMC firmware stack 220 on the BMC 132. In one embodiment, the bootloader 222 includes a Universal boot loader (Das U-Boot), which is provided under an open source license, and is primarily adapted used in embedded processor devices to bootstrap the BMC firmware stack's operating system's kernel.

In another embodiment, the bootloader 222 may include logic for receiving user input for selecting which parameters may be monitored and/or processed by the engine 224. In one embodiment, the bootloader 222 may include a configuration file that can be edited for selecting, by a user, which parameters may be monitored, and which parameters may be managed by the engine 224. For example, the configuration file may include fields for selecting whether or not a fan speed and/or a memory write rate may be monitored and/or controlled by the engine 224.

In some scenarios, the actions of the engine 224 may be considered to be overly limiting as seen through the perspective of the user. As such, the user is provided with the ability to control whether or not certain actions are performed by the engine 224. Nevertheless, disabling of such protection mechanisms may cause harm to the IHS 100 and/or BMC 132 due to malfunction of the custom BMC firmware stack 220. Therefore, the engine 224 is configured to continually log events during its operation, such as those parameters that are received by the engine 224 as well as actions that are taken to remediate those parameters when they are deemed to be excessive. The logged events may be stored in the logfile storage 226 for retrieval and analysis at a later point in time. In one embodiment, the logged events may be retrieved remotely, such as using network 124 via network interface device 122. For example, if the IHS 100 were to experience a failure condition, an administrator of the IHS 100 may access, using the system management console 126, the records in the logfile storage 226 to determine whether or not the failure condition was caused by disabling of the protection mechanisms provided by the engine 224. Thus, the administrator may be provided with the ability to properly administer warranty policies or other contractual agreements(s) for the IHS 100 based on the manner in which the IHS 100 was used by the user. The administrator may be any entity that oversees, guarantees, or warranties the operation of the IHS 100, such as a vendor that assembled, manufactured, sold, or otherwise provided the IHS 100 to the user.

In one embodiment, the engine 224 may encrypt the records stored in logfile storage 226 to reduce their ability of being tampered with. For example, the records may be encrypted using a private key that performs a cryptographic hash against the data in the records such that a valid recipient, such as an administrator of the IHS 100, may be able to attest to the authenticity of such records. The private key may be generated using one or more variables (e.g., engine 224 version ID number, IHS unique ID, BMC unique ID, etc.) that are inputted into a key derivation function. In certain cases, key protection may be provided by certain SoC capabilities (e.g., ARM Trustzone, trusted execution environment (TEE), memory management unit (MMU) config, etc.) or other mechanisms, such as coprocessor-baseboard processor (CP-ARM) joint test action group (JTAG), and the like.

Baseboard processor 202 may include any suitable type of processor, such as an advanced RISC machine (ARM) processor. Baseboard processor 202 executes a standard BMC firmware stack (not shown) or a custom BMC firmware stack 220 that is stored in a BMC memory 212. A standard BMC firmware stack may be, for example, an IHS vendor provided firmware stack (e.g., an iDRAC provided by the DELL CORPORATION), while the custom BMC firmware stack 220 may be one created by a user of the IHS, such as one implemented using the openBMC framework. The custom BMC firmware stack 220 may provide out-of-band monitoring and management of the components of the IHS 100. Examples of monitoring functions that the custom BMC firmware stack 220 may provide include, for example, monitoring internal ambient temperatures and/or voltages in the IHS 100, along with monitoring CPU, memory, and network usage levels, and the like. Examples of management features may include installation of software including the base operating system, of the IHS 100, controlling fan speed of one or more fans in the IHS 100, turning certain resources of the IHS 100 on or off, and the like.

Coprocessor 204 functions independently of baseboard processor 202 to monitor its operations. In one embodiment, the coprocessor 204 may be configured to continually monitor the engine 224 to ensure that it is not modified or illicitly accessed by the custom BMC firmware stack 220. For example, the coprocessor 204 may periodically perform a cyclic redundancy check (CRC) process on the engine 224 and compare its derived value against previously derived values to determine if any code in the engine 224 has changed. If so, the coprocessor 204 may generate a coprocessor tampering alert message 240 as described herein below.

Custom BMC firmware stacks 220 are typically created by users whose development efforts are not closely controlled by the vendor of the IHS 100 and as such, it may include logic that may not be aware of all of the intricacies of the IHS 100 it is designed to manage. Thus, the engine 224 may be configured with logic for providing out-of-band monitoring of these custom BMC firmware stacks 220 so that, in the event that it causes certain conditions within the IHS 100 to become dangerous for its proper operation, the engine 224 may generate an alert and/or management signal for remediating the dangerous conditions. Throughout this disclosure, the terms 'signal' and 'message' may be used interchangeably to mean any informational mechanism transmitted from one component of the system to another. The engine 224 may, in certain cases, be considered to operate out-of-band with respect to the baseboard processor 202 because the actions of the engine 224 function independently or is not controller by those of the baseboard processor 202. Thus, the engine 224 may provide monitoring capabilities over the baseboard processor 202 regardless of what type of logic that it is implemented with.

Elements of the engine 224 may be configured to provide certain features of the custom BMC firmware stack monitoring system disclosed herein. In one embodiment, the engine 224 may monitor certain operational parameters of the components of the BMC 132 to ensure that protection levels for the IHS 100 are not exceeded, and in particular, to actions that may be performed by the custom BMC firmware stack 220. Operational parameters generally refer to measured and/or calculated values (e.g., output voltage, current draw, temperature, data throughput, storage capacity, processing rate (MIPs), etc.) associated with the operation and/or configuration of certain components of the IHS 100 or BMC 132. For example, the engine 224 may communicate with one or more fan controllers 208 configured on the BMC 132 to receive a fan speed signal 230 associated with the fans configured in the IHS 100. As another example, the engine 224 may communicate with the BMC memory 212 to receive memory usage stats 232 (e.g., memory write rates, memory read rates, remaining storage capacity, etc.). The engine 224 may also monitor certain operational parameters of the IHS 100. For example, the engine 224 may communicate with the BIOS/UEFI 110/140 of the IHS 100 to receive hardware configuration and/or inventory information 234 associated with the components of the IHS 100. Additionally, the engine 224 may communicate with the processor chipset 214 of the IHS 100 to receive CPU, memory, and I/O usage information 236 associated with the IHS processors 102, non-volatile storage 134, and I/O devices 120 of the IHS 100, respectively.

The engine 224 may also include logic for determining, based upon the monitored information, whether or not certain protection parameters of the IHS 100 and/or BMC 132 have been exceeded. Protection parameters generally refer to those parameters of certain components that should be maintained within certain limits in order to not adversely affect its operation or the operation of other components with which it is associated. If those protection parameters are exceeded, the engine 224 may generate alerts and/or protection signals to remediate the exceeded protection parameter. An alert generally refers to any signal or message that may be generated for notifying the user or another component of the custom BMC firmware stack monitoring system that a protection parameter has been exceeded.

In one embodiment, if the engine 224 determines that a certain protection parameter has exceeded a threshold value, it may send a baseboard processor alert signal 238 to the baseboard processor 202 so that the custom BMC firmware stack 220 on which it is running can perform any corrective action necessary to alleviate the exceeded protection parameter. The engine 224 may then generate the baseboard processor alert signal 238 by writing an alert message to a shared memory location in the BMC memory 212 such that when the custom BMC firmware stack 220 detects the alert message, it can process the message. For example, the custom BMC firmware stack 220 may process the alert message, and may generate an audible or visible message, such as a pop-up window on the screen of a user interface alerting the user that a particular protection parameter has been exceeded.

In another embodiment, if the engine 224 determines that a certain protection parameter has been exceeded, it may generate a BIOS alert message 240 to notify the BIOS 110 of the IHS 100 that the protection parameter has been exceeded. When the BIOS 110 receives such a BIOS alert message 240, it may lock the bootstrap code of the BIOS 110 into a user input mode (e.g., F1/F2) so that user input (e.g., voluntary overriding) of the alert condition is required when the IHS 100 is re-started.

The engine 224 may also generate protection signals or messages for manipulating certain components of the IHS 100 or BMC 132 to remediate the exceeded protection parameter. In one embodiment, the engine 224 may, using the gathered operational parameters, calculate an estimated fan speed for each of the fans configured in the IHS 100, and compare the calculated fan speed against its actual fan speed. When the calculated fan speed is greater than the actual fan speed, the engine 224 may override the actual fan speed, which is typically set by the custom BMC firmware stack 220, to set the fan at the higher fan speed using an RPM control signal 242. Setting the fan speed to the higher of either that set by the custom BMC firmware stack 220 or the estimated value calculated by the engine 224 increases the likelihood that a sufficient amount of cooling level is provided to the IHS 100 in certain embodiments.

In another embodiment, the engine 224 restricts write access to the BMC memory 212 if certain memory operations performed by the custom BMC firmware stack 220 become excessive. While current BMC implementations often include certain memory devices (e.g., eMMC, eUFS, LPDDR, etc.) due to their relatively small package sized, low cost, and high availability, its memory can become corrupted or even the memory device itself damaged if it is subjected to abnormal use by the custom BMC firmware stack 220, such as performing an excessive level of write cycles (e.g., write rates) to the BMC memory 212. As such, the engine 224 may continually monitor the memory usage stats signal 232 to detect such conditions and if detected, it may control the BMC memory 212 to restrict its ability to be written to. In some embodiments, the engine 224 may also include logic for notifying the user of such a condition, and/or selectively limiting (e.g., throttling) write cycles to the BMC memory 212 by generating a write protect message 246 to maintain a desired write cycle rate or in some cases, to disallow further write sequences to the BMC memory 212 altogether.

Controller chip 206 includes logic for controlling certain features of the IHS 100 and/or BMC 132. In one embodiment, a Complex Programmable Logic Device (CPLD) can be used to implement the controller chip. For example, the controller chip 206 may include logic for, in response to receiving certain input signals, activating or deactivating one or more signals or messages to the baseboard processor 202 and/or coprocessor 204. As another example, the controller chip 206 may include logic for disabling the baseboard processor 202 or coprocessor 204 by holding it in reset so that it cannot boot.

In one embodiment, the controller chip 206 includes logic for monitoring reboots performed by the coprocessor 204. When the baseboard processor is running a custom BMC firmware stack 220, it would be beneficial to inhibit the custom BMC firmware stack from hindering the coprocessor 204 from performing its duties. For example, when a custom BMC firmware stack 220 is loaded on the baseboard processor 202, the controller chip 206 may recognize this condition and in response, inhibit the ability of the custom BMC firmware stack 220 from resetting or accessing the memory, state, and/or configuration of the coprocessor 204. Because rebooting of the engine 224 may inadvertently occur for several reasons (e.g., when the IHS 100 is rebooted), the controller chip 206 may receive a coprocessor reload signal 248 from the coprocessor 204 each time it is rebooted. Nevertheless, illegitimate (either malicious or inadvertent) logic may still exist in the custom BMC firmware stack 220 that causes the coprocessor 204 to be illicitly rebooted. The controller chip 206 may be configured with logic to detect when such an illicit reboot of the coprocessor 204 has been encountered, and if so, generate a coprocessor tampering alert message 250 that is sent to the BIOS/UEFI 110/140 of the IHS 100. Accordingly, the BIOS 110 may lock the BIOS 110 in a user input mode, such as described above in response to receipt of the coprocessor tampering alert message 250.

Figure 3:
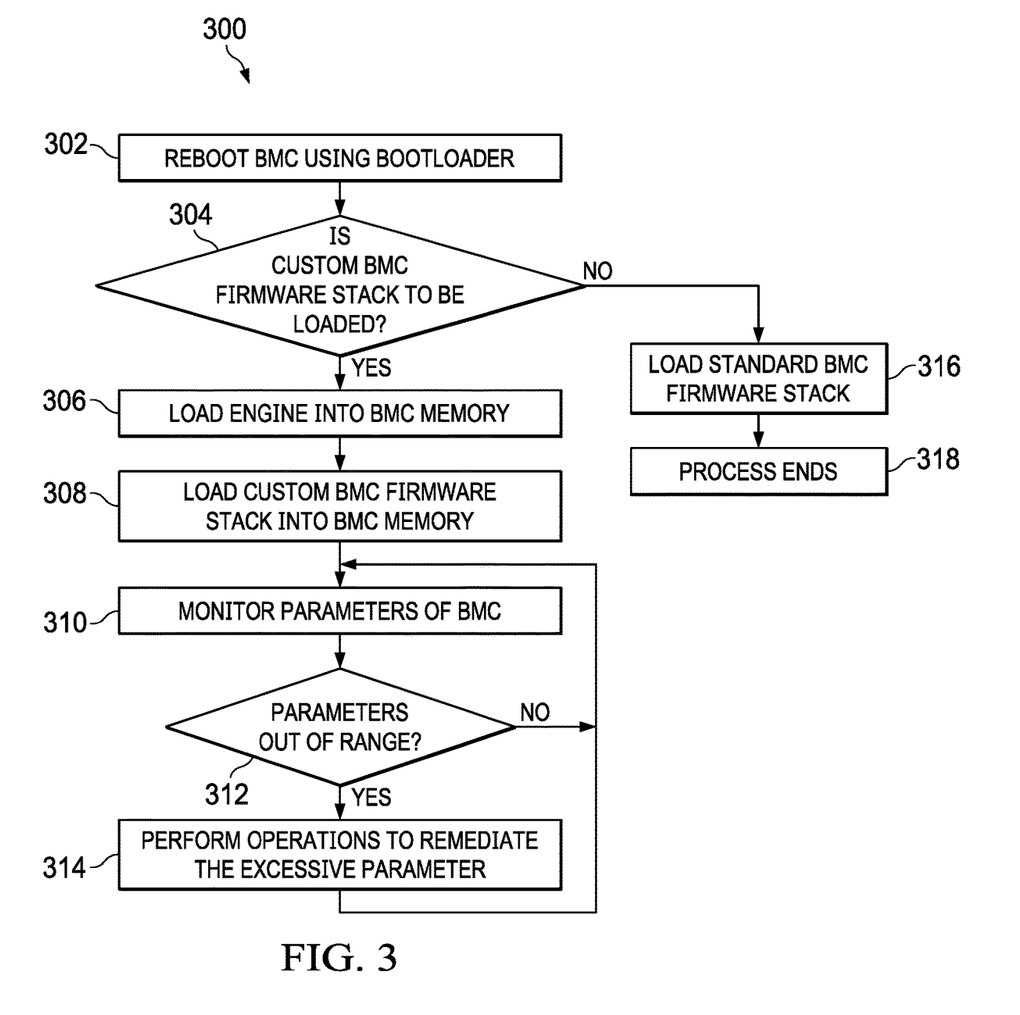
FIG. 3 illustrates an example custom BMC firmware stack monitoring method that may be performed to monitor the operation of a custom BMC firmware stack according to one embodiment of the present disclosure.

FIG. 3 illustrates an example custom BMC firmware stack monitoring method 300 that may be performed to monitor the operation of a custom BMC firmware stack 220 according to one embodiment of the present disclosure. In one embodiment, the method 300 may be performed each time the IHS 100 and the BMC 132 are booted. The method 300 may be performed in whole, or at least in part, by the engine 224, and in particular, a version of the engine 224 that is loaded in response to detecting a custom BMC firmware stack 220 being loaded into the baseboard processor 202.

At step 302, the BMC 132 is booted using a suitable bootloader, such as a Universal boot loader (Das U-Boot). At step 304, the bootloader determines whether the firmware stack to be loaded is a custom BMC firmware stack 220. If not, processing continues at step 316 to load a standard BMC firmware stack 220, and finally at step 318 in which the process 300 ends. Nevertheless, if a custom BMC firmware stack 220 (e.g., openBMC-based firmware stack) is to be loaded, processing continues at step 306.

At step 306, the bootloader loads the engine 224 into BMC memory 212, and at step 308, the bootloader loads the custom BMC firmware stack 220 on the BMC memory 212.

At step 310, the method 300 commences monitoring of certain parameters of the IHS 100 and BMC 132. The monitored parameters may include any type that provides information about the performance level of certain components as well as any critical levels that if exceeded, may cause those components to not function properly or even cause damage to those components. In some embodiments, the coprocessor 204 may include logic for calculating certain additional parameters from certain parameters acquired from the IHS 100 or BMC 132. Additional details associated with how the coprocessor 204 obtains and processes received parameters will be described in detail below with reference to FIG. 4.

At step 312, the method 300 determines whether any acquired parameters or calculated parameters have exceeded a specified threshold. For example, the method 300 may compare a parameter against a specified threshold value, and if that parameter exceeds the specified threshold value, then the parameter has been deemed to be out of range. If so, processing continues at step 314; otherwise processing continues at step 310 to continue monitoring of the IHS 100 and BMC 132.

At step 314, the method 300 performs one or more operations to remediate the excessive parameter. In one embodiment, the method 300 may generate an alert signal or message, such as one in which alert information is stored in a shared memory portion of the BMC 132 so that the custom BMC firmware stack 220 can receive and process the alert information. In another embodiment, the method 300 may remediate the excessive parameter by controlling certain components of the IHS 100 or BMC 132. For example, the method 300 may generate an RPM control message 242 for controlling the fan speed of a fan, generate a write protect message 246 for setting access and/or write limits on the BMC memory 212, or generate a BIOS alert message 234 for communicating with the BIOS 110 of the IHS 100 to lock the IHS 100 in a user input mode.

Following remediation of the excessive parameter, the method 300 continues processing at step 310 for ongoing monitoring of the parameters of the IHS 100 and BMC 132. Nevertheless, when use of the method 300 is no longer needed or desired, the method 300 ends.

Although FIG. 3 describes one example of a method that may be performed for continual monitoring of the health of the IHS 100 and BMC 132 when a custom BMC firmware stack 220 is loaded on a BMC 132, the features of the disclosed process may be embodied in other specific forms without deviating from the spirit and scope of the present disclosure. For example, the method 300 may perform additional, fewer, or different operations than those operations as described in the present example. As another example, certain steps of the aforedescribed process may be performed by other components of the BMC 132 and/or IHS 100, such as by the controller chip 206 configured on the BMC 132, or by the BIOS 110 executed on the IHS 100.

Figure 4:
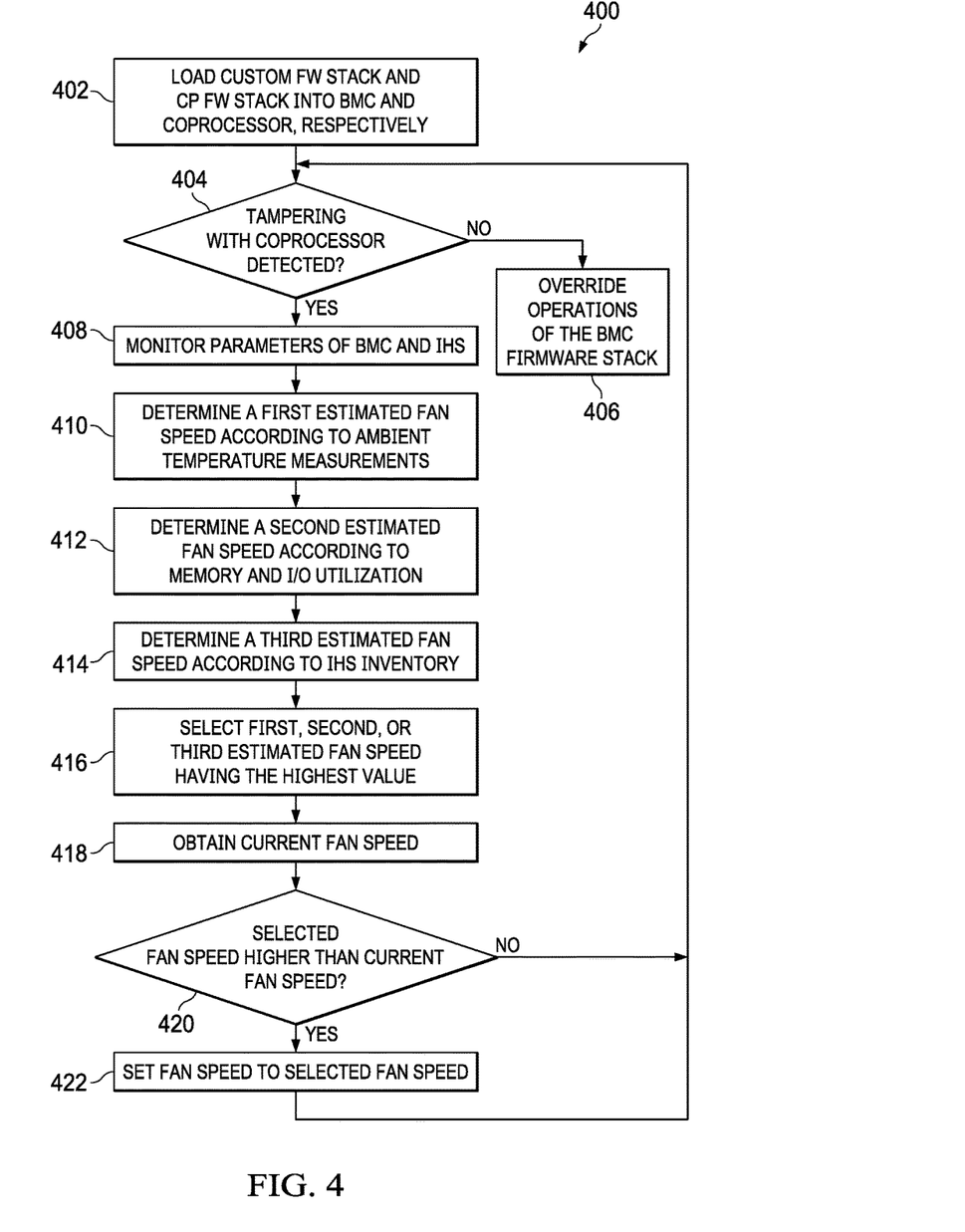
FIG. 4 illustrates an example parameter monitoring method that may be performed by the custom BMC firmware stack monitoring system according to one embodiment of the present disclosure.

FIG. 4 illustrates an example parameter monitoring method 400 that may be performed by the custom BMC firmware stack monitoring system according to one embodiment of the present disclosure. The method 400 may be performed in whole, or at least in part, by the controller chip 206 and/or engine 224, and in particular, the engine 224 that is loaded in response to detecting a custom BMC firmware stack 220 being loaded onto the baseboard processor 202. Initially, the method 400 may comprise certain actions that are performed as described above with reference to step 316 of FIG. 3.

At step 402, the engine 224 is loaded and started when a custom BMC firmware stack 220 is loaded on the BMC 132. Thereafter at step 404, as the custom BMC firmware stack 220 is being executed on the baseboard processor 202, the controller chip 206 determines whether or not the coprocessor 204 has been tampered with. For example, the controller chip 206 may determine that the coprocessor 204 has been tampered with when the coprocessor 204 undergoes an ill-timed reset, or when another process, such as the custom BMC firmware stack 220 attempts to access the coprocessor memory space or attempts to control or modify some part of the coprocessor 204. If so, processing continues at step 406; otherwise, processing continues at step 408.

At step 406, the controller chip 206 performs one or more operations to override the operation of the custom BMC firmware stack 220. That is, the controller chip 206 effectively seizes control over the operation of the BMC 132 when it detects that the coprocessor 204 has been compromised. For example, the controller chip 206 may communicate with the fan controllers 208 to set the fans at maximum speed to reduce any chance of overheating due to any malicious activity that may be occurring to the IHS 100. As another example, the controller chip 206 may inhibit the custom BMC firmware stack 220 from any further processing, such as by holding the BMC 132 in reset.

Step 408 is performed in the event that no tampering has been detected by the controller chip 206. At step 408, the method 400 monitors the parameters of the BMC 132 and/or IHS 100. For example, the coprocessor 204 may receive operational parameters associated with a temperature of various components of the IHS 100 using a distributed temperature sensing system (DTS) that measures temperatures using optical fibers functioning as linear sensors, processor and/or memory usage levels using a system monitor executed on the IHS 100, and I/O operational parameters using network controller configured in the IHS 100, among others.

Steps 410-422 described herein below provide a means of overriding the fan speed of the fans of the IHS 100 in the event that the custom BMC firmware stack 220 sets the fan speed at an insufficient level. The custom BMC firmware stack 220 ordinarily possesses the ability to adjust the fan speed of the fans of the IHS 100; however, the custom BMC firmware stack 220 may possess certain flaws (e.g., bugs) that improperly sets the fan speeds at an insufficient level such that, if no intervention is provided, causes the IHS 100 to cease operating properly or even become overheated.

At step 410, the method 400 determines a first estimated fan speed according to ambient temperature measurements. For example, the engine 224 may read the CPU DTS measurements through the serial platform environment control interface (PECI) and calculate the first estimated fan speed using the received temperature measurements. At step 412, the method 400 determines a second estimated fan speed according to memory and I/O utilization. For example, the engine 224 may obtain memory and I/O utilization through the PECI and calculate the second estimated fan speed based on a characterized curve. At step 414, the method 400 determines a third estimated fan speed according to the IHS's inventory. For example, the BIOS 110 may possess logic for obtaining an inventory of some, most, or all components (e.g., CPU, hard disk drive(s), memory, network controller cards, peripheral devices, etc.) along with additional logic to determine, according to the inventory, a cumulative amount of heat that the components identified by the inventory may generate during usage. The BIOS 110 may then, using the determined cumulative amount of heat generation, select a tier number that ranges from 1 to 20 in which tier 1 represents the lowest heat generation, and 20 represent the highest level of heat generation. The engine 224 may receive this tier level number from the BIOS 110, and select the third estimated fan speed based on this tier number.

At step 416, the method 400 selects the first, second, or third estimated fan speed having the highest value. Whereas the drawbacks of having a fan speed that is too high only results in lower power efficiency, the drawbacks of having a fan speed that is too low can often result in damage to the components of the IHS 100. Additionally, by providing multiple estimated fan speed values (e.g., first, second, and third estimated fan speed values), reliability is increased due to the ability to reject outlier values that can, and often do, occur with any value estimation system.

At step 418, the method 400 obtains the current fan speed that the fans in the IHS 100 are operating at. For example, the engine 224 may communicate with the fan controllers 208 to obtain the current fan speed of each of the fans in the IHS 100. Thereafter at step 420, the method 400 determines whether the selected fan speed higher than current fan speed. If not, the fan speed is not adjusted and processing continues at step 404; otherwise, processing continues at step 422. At step 422, the method 400 sets the fan speed of the fans to the estimated fan speed selected at step 416. For example, the engine 224 may communicate with the fan controllers 208 to set each of the fans in the IHS 100 to the selected fan speed.

The method 400 described is repeatedly performed throughout the usage of the custom BMC firmware stack 220 on the BMC 132. Nevertheless, when use of the process 400 is no longer needed or desired, the process 400 ends.

Although FIG. 4 describes one example of a process that may be performed to monitor the BMC 132 during use of a custom BMC firmware stack 220, the features of the disclosed process may be embodied in other specific forms without deviating from the spirit and scope of the present disclosure. For example, the method 400 may perform additional, fewer, or different operations than those operations as described in the present example. As another example, although the method 400 described calculating three estimated fan speeds based on ambient temperature measurements, memory and I/O utilization, and IHS inventory, it is contemplated that only a subset of these techniques may be used to calculate estimated fan speeds, or that other additional factors not necessarily described herein may be used to calculate other estimated fan speeds from which a final estimated fan speed may be selected.

It should be understood that various operations described herein may be implemented in software or software modules executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements that such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains"

one or more operations possesses those one or more operations but is not limited to possessing only those one or more operations.

The invention claimed is:

1. An Information Handling System (IHS), comprising:
a plurality of hardware devices; and
a Baseboard Management Controller (BMC) in communication with the plurality of hardware devices, the BMC comprising one or more processors and one or more memory units including instructions that, upon execution by the processors, are executed to:
when a custom BMC firmware stack is executed on the BMC to control a parameter of one or more of the hardware devices of the IHS, monitor the parameter by a vendor provided BMC firmware stack, wherein the instructions of the vendor provided BMC firmware stack are separate and distinct from the instructions of the custom BMC firmware stack, and wherein the custom BMC firmware stack is provided independently of the vendor; and
when the parameter exceeds a specified threshold, control, by the vendor provided BMC firmware stack, the BMC to perform one or more operations to remediate the excessive parameter.

2. The IHS of claim 1, wherein the instructions are further executed to:
log the monitored parameter and the performed operations in a logfile, the logfile encrypted using a private key that is known to the vendor of the IHS, wherein the private key is unique to the IHS from among a plurality of the IHSs; and
transmit the encrypted logfile to the vendor.

3. The IHS of claim 2, wherein the BMC further comprises a coprocessor that is executed to verify whether or not the instructions have been tampered with, and log the verification in the encrypted logfile at an ongoing basis.

4. The IHS of claim 1, wherein the instructions are further executed to receive user input for selecting a type of one or more of the parameters that are to be monitored by the instructions.

5. The IHS of claim 1, wherein the BMC comprises a bootloader that is executed to:
in response to detecting that the custom BMC firmware stack is booted on the BMC, load the instructions into a first portion of the memory units that is separate and distinct from a second portion of the memory units in which the custom BMC firmware stack is loaded.

6. The IHS of claim 5, wherein the instructions are further executed to restrict access to the first portion of the memory units by the custom BMC firmware stack.

7. The IHS of claim 1, wherein the instructions are further executed to remediate the excessive parameter by controlling a fan speed of one or more fans configured in the IHS.

8. The IHS of claim 1, wherein the instructions are further executed to remediate the excessive parameter by controlling access to a memory storage component of the BMC by the custom BMC firmware stack.

9. The IHS of claim 1, wherein the instructions are further executed to remediate the excessive parameter by locking the BIOS of the IHS in a user input mode.

10. The IHS of claim 1, wherein the instructions are further executed to remediate the excessive parameter by writing a warning message to a shared memory location of the BMC, wherein the custom BMC firmware stack is configured to read the warning message from the shared memory location and display the warning message for view by a user.

11. A method comprising:
when a custom Baseboard Management Controller (BMC) firmware stack is executed on the BMC to control a parameter of one or more of the hardware devices of the an Information Handling System (IHS), monitoring the parameter by a vendor provided BMC firmware stack, wherein the instructions of the vendor provided BMC firmware stack are separate and distinct from the instructions of the custom BMC firmware stack, and wherein the custom BMC firmware stack is provided independently of the vendor; and
when the parameter exceeds a specified threshold, controlling, by the vendor provided BMC firmware stack, the BMC to perform one or more operations to remediate the excessive parameter.

12. The method of claim 11, further comprising:
logging the monitored parameter and the performed operations in a logfile, the logfile encrypted using a private key that is known to the vendor of the IHS, wherein the private key is unique to the IHS from among a plurality of the IHSs; and
transmitting the encrypted logfile to the vendor.

13. The method of claim 12, further comprising verifying, using a coprocessor, whether or not the instructions have been tampered with, and log the verification in the encrypted logfile at an ongoing basis.

14. The method of claim 11, further comprising receiving user input for selecting a type of one or more of the parameters that are to be monitored by the instructions.

15. The method of claim 11, further comprising in response to detecting that the custom BMC firmware stack is booted on the BMC, loading, by a bootloader, the instructions into a first portion of the memory units that is separate and distinct from a second portion of the memory units in which the custom BMC firmware stack is loaded.

16. The method of claim 15, further comprising restricting access to the first portion of the memory units by the custom BMC firmware stack.

17. The method of claim 11, further comprising remediating the excessive parameter by at least one of controlling a fan speed of one or more fans configured in the IHS, controlling access to a memory storage component of the BMC by the custom BMC firmware stack, locking the BIOS of the IHS in a user input mode, and writing a warning message to a shared memory location of the BMC, wherein the custom BMC firmware stack is configured to read the warning message from the shared memory location and display the warning message for view by a user.

18. A hardware memory device having program instructions stored thereon that, upon execution by a baseboard Management Controller (BMC) of an Information Handling System (IHS), cause the BMC to:
when a custom BMC firmware stack is executed on the BMC to control a parameter of one or more of the hardware devices of the IHS, monitor the parameter by a vendor provided BMC firmware stack, wherein the instructions of the vendor provided BMC firmware stack are separate and distinct from the instructions of the custom BMC firmware stack, and wherein the custom BMC firmware stack is provided independently of the vendor; and
when the parameter exceeds a specified threshold, control, by the vendor provided BMC firmware stack, the BMC to perform one or more operations to remediate the excessive parameter.

19. The hardware memory device of claim 18, wherein the instructions are further executed to:

log the monitored parameter and the performed operations in a logfile, the logfile encrypted using a private key that is known to the vendor of the IHS, wherein the private key is unique to the IHS from among a plurality of the IHSs; and transmit the encrypted logfile to the vendor; and verify, using a coprocessor, whether or not the instructions have not been tampered with, and log the verification in the encrypted logfile at an ongoing basis.

\* \* \* \* \*